(12) United States Patent
Terada

(10) Patent No.: US 8,297,324 B2
(45) Date of Patent: Oct. 30, 2012

(54) PNEUMATIC TIRE FOR MOTORCYCLE

(75) Inventor: Kouji Terada, Kokubunji (JP)

(73) Assignee: Bridgestone Corporation, Tokyo (JP)

( * ) Notice: Subject to any disclaimer, the term of this patent is extended or adjusted under 35 U.S.C. 154(b) by 541 days.

(21) Appl. No.: 12/525,027

(22) PCT Filed: Dec. 14, 2007

(86) PCT No.: PCT/JP2007/074163
§ 371 (c)(1),
(2), (4) Date: Jul. 29, 2009

(87) PCT Pub. No.: WO2008/093473
PCT Pub. Date: Aug. 7, 2008

(65) Prior Publication Data
US 2010/0132862 A1    Jun. 3, 2010

(30) Foreign Application Priority Data

Feb. 1, 2007  (JP) .................................. 2007-023047

(51) Int. Cl.
*B60C 1/00* (2006.01)
*B60C 11/00* (2006.01)
(52) U.S. Cl. ................................. 152/209.5; 152/209.11
(58) Field of Classification Search ............... 152/209.5, 152/209.11
See application file for complete search history.

(56) References Cited

U.S. PATENT DOCUMENTS

| | | |
|---|---|---|
| 6,540,858 B1 | 4/2003 | Caretta et al. |
| 2005/0167019 A1 | 8/2005 | Puhala et al. |
| 2006/0207701 A1 | 9/2006 | Tanaka |

FOREIGN PATENT DOCUMENTS

| | | | |
|---|---|---|---|
| EP | 1 561 605 A2 | | 8/2005 |
| JP | 60-094804 A | * | 5/1985 |
| JP | 60-094804 A | | 5/1985 |
| JP | 10-119513 A | * | 5/1998 |
| JP | 10-119513 A | | 5/1998 |

(Continued)

OTHER PUBLICATIONS

Machine translation for Japan 10-119513 (no date).*

(Continued)

*Primary Examiner* — Steven D Maki
(74) *Attorney, Agent, or Firm* — Sughrue Mion, PLLC

(57) ABSTRACT

The present invention provides a pneumatic tire for a motorcycle, in which tire durability at a relatively high speed in running straight is enhanced with maintaining good gripping performances in cornering situation by optimizing the distribution of loss tangent in tread rubbers constituting a tread portion. The pneumatic tire for a motorcycle includes a pair of bead portions 1 having bead cores embedded therein, a pair of sidewalls 2 extending on the outer side in the tire radial direction from the bead portions 1, and a tread portion 3 extending over the respective sidewall portions 2, wherein the tread portion 3 is constituted of at least four tread regions such that, when the tread regions are viewed in a section in the tire widthwise direction, loss tangent values of rubbers constituting the adjacent tread regions are different from each other, and a loss tangent value of a rubber constituting a center tread region 5 as a tread region including the tire equatorial plane 4, of the tread regions, is smaller than a loss tangent value of each of rubbers constituting other tread regions 6.

6 Claims, 4 Drawing Sheets

FOREIGN PATENT DOCUMENTS

| | | |
|---|---|---|
| JP | 11-011114 A | 1/1999 |
| JP | 2006-256385 A | 9/2006 |
| JP | 2006-273240 A | 10/2006 |
| WO | 2005/030503 A1 | 4/2005 |

OTHER PUBLICATIONS

Supplementary European Search Report issued in European Application 07859837.2-2425/2108529 dated Jul. 22, 2010 (6 pages).

Japanese Office Action issued in Japanese Application No. 2007-023047, dated Sep. 20, 2011.

Chinese Office Action issued in Chinese Application No. 200780050651.X dated Jul. 27, 2011.

International Search Report for PCT/JP2007/074163, mailed Mar. 25, 2008.

Japanese Office Action issued in Application No. 2007-023047 dated Dec. 20, 2011.

\* cited by examiner

PNEUMATIC TIRE FOR MOTORCYCLE

TECHNICAL FIELD

The present invention relates to a pneumatic tire for a motorcycle including a pair of bead portions having bead cores embedded therein, a pair of sidewalls extending on the outer side in the tire radial direction from the bead portions, and a tread portion extending over the respective sidewall portions and, in particular, a pneumatic tire for a motorcycle for use in running on a dry road surface at a relatively high speed. The present invention aims at improving gripping performance in cornering and durability at a relatively high speed in running straight of the pneumatic tire for a motorcycle.

PRIOR ART

Driving force of a pneumatic tire for a motorcycle is determined, when the tire is running straight, by traction performance thereof. Good traction performance can be attained by constituting, a tread portion of the tire, of a rubber having relatively large elastic modulus, rubber hardness and relatively small loss tangent. Further, a pneumatic tire for a motorcycle effects cornering by banking in cornering situation. During such cornering as this, mainly a shoulder region of the tread portion is brought into contact with a road surface and friction force between the shoulder region and the road surface resists against centrifugal force to effect balancing, whereby cornering is achieved. Such friction force as described above correlates with gripping performances of a pneumatic tire for a motor cycle. Good gripping performance can be attained by constituting the tread portion of a rubber having relatively small elastic modulus and rubber hardness and relatively large loss tangent. In view of the aforementioned facts, in a racing tire which holds cornering performance in great account or encounters many cornering occasions, in particular, there has been used a pneumatic tire for a motorcycle having relatively small rubber hardness and elastic modulus and relatively large loss tangent in the entire tread portion. However, in such a pneumatic tire for a motorcycle as described above, although gripping performance in cornering situation is sufficiently ensured, the loss tangent at a tread portion in a ground-contact area of the tread in running straight is too large and thus generation of heat, which tends to cause a trouble in the tread portion, may not be suppressed.

Therefore, as described in JP 60-094804 and JP 2006-273240, there has been developed a pneumatic tire for a motorcycle, comprising a tread portion constituted of three tread regions, i.e. a center tread region including the tire equatorial plane and two shoulder tread regions located to interpose the center tread region therebetween, wherein the center tread region is formed of rubber having relatively small loss tangent and the shoulder tread regions are formed of rubber having relatively large loss tangent, so that heat generation is suppressed, while good gripping performance is ensured by the rubber having relatively large loss tangent in cornering situation and good traction performance is ensured by the rubber having relatively small loss tangent in running straight.

Further, as disclosed in JP 11-011114, there has been developed a pneumatic tire for a motorcycle, comprising a tread portion constituted of three tread regions, i.e. a center tread region including the tire equatorial plane and two shoulder tread regions located to interpose the center tread region therebetween, wherein the center tread region is formed of rubber having relatively small hysteresis loss and the shoulder tread regions are formed of rubber having relatively large hysteresis loss, so that generation of heat in the center tread region is suppressed, while good gripping performance is ensured by the rubber having relatively large hysteresis loss in cornering situation and good traction performance is ensured by the rubber having relatively small hysteresis loss in running straight.

DISCLOSURE OF THE INVENTION

In general, in such a pneumatic tire for a motorcycle capable of running at a relatively high speed as used in racing, the temperature at a tread portion rises up to a high temperature in the range of e.g. 80 to 100° C. in running straight. The pneumatic tires as disclosed in JP 60-094804, JP 2006-273240 and JP 11-011114, however, each intend to optimize only the traction performance and the gripping performance around 60° C. and fail to optimize these performances at a temperature higher than 60° C. Therefore, in a case where such a pneumatic tire as those of the references above is mounted to a racing vehicle and driven to run straight at a relatively high speed, there is a concern that durability of the tire may not be sufficient.

Accordingly, an object of the present invention is to provide a pneumatic tire for a motorcycle, in which durability at a relatively high speed in running straight is enhanced with maintaining good gripping performances in cornering situation by optimizing the distribution of loss tangent in tread rubbers constituting a tread portion.

In order to achieve the object, the present invention provides a pneumatic tire for a motorcycle, including a pair of bead portions having bead cores embedded therein, a pair of sidewalls extending on the outer side in the tire radial direction from the bead portions, and a tread portion extending over the respective sidewall portions, wherein the tread portion is constituted of at least four tread regions such that, when the tread regions are viewed in a section in the tire widthwise direction, loss tangent values of rubbers constituting the adjacent tread regions are different from each other, and a loss tangent value of a rubber constituting a center tread region as a tread region including the tire equatorial plane, of the tread regions, is smaller than a loss tangent of each of rubbers constituting other tread regions. In such a pneumatic tire for a motorcycle, since the distribution of loss tangent of the rubbers constituting the tread portion is optimized, generation of heat at the rubbers is suppressed, with retaining good gripping performance in cornering situation, whereby a trouble in the tread portion due to excess heat generation in the rubbers can be effectively prevented and durability at a relatively high speed in running straight can be sufficiently enhanced. In the present invention, "loss tangent" represents loss tangent (tan δ) expressed as a ratio of loss modulus with respect to dynamic modulus and such a loss tangent was measured by using a spectrometer manufactured by Ueshima Seisakusho Co., Ltd. under the conditions of the initial elongation rate being 6%, the strain rate under vibration being 4%, and frequency being 52 Hz.

Regarding the loss tangent values of the rubbers constituting the tread regions, it is preferable that a rubber of a tread region disposed in the outer side in the tire widthwise direction has the larger loss tangent.

Further, the loss tangent of each of the rubbers constituting said other tread regions is preferably in the range of 105 to 150% of the loss tangent of the rubber constituting the center tread region.

Yet further, it is preferable that the tread portion is constituted of the center tread region, two shoulder tread regions each including a ground contact end of the tread portion, and two intermediate tread regions interposed by the center tread region and the respective shoulder tread regions.

Yet further, it is preferable that the width of the center tread region is in the range of 0.15 to 0.35 times as wide as the tread width, the sum of the widths of the two intermediate tread regions is in the range of 0.25 to 0.80 times as wide as the tread width, and the sum of the widths of the two shoulder tread regions is in the range of 0.05 to 0.40 times as wide as the tread width. In the present specification, a "tread width" and a "width of a tread region" each represent a corresponding distance in a section of a tread in the tire widthwise direction, measured along a periphery of the tread portion.

Yet further, the loss tangent of each of the rubbers constituting the shoulder tread region is preferably in the range of 105 to 135% of the loss tangent of each of the rubbers constituting the intermediate tread portions.

According to the present invention, there can be provided a pneumatic tire for a motorcycle, in which durability at a relatively high speed in running straight is enhanced with maintaining good gripping performance in cornering situation by optimizing the distribution of loss tangent of tread rubbers constituting a tread portion.

EXPLANATION OF REFERENCE NUMERALS

Figure 1:
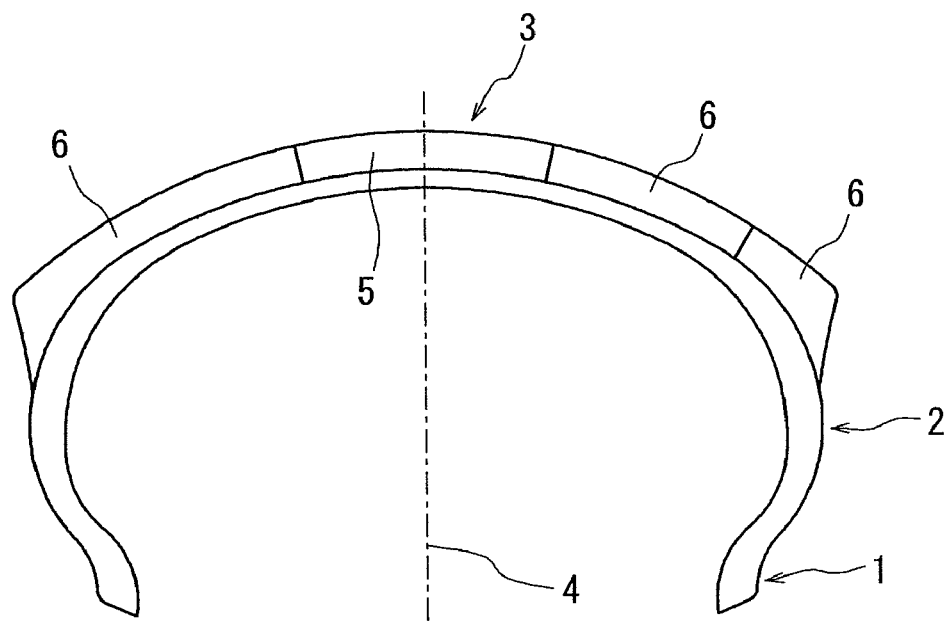
FIG. 1 is a sectional view in the tire widthwise direction of a representative tire according to the present invention.

1 Bead portion
2 Sidewall portion
3 Tread portion
4 Tire equatorial plane
5 Center tread region
6 Other tread regions
7 Shoulder tread region
8 Intermediate tread region
9 Surface rubber layer

BEST MODE FOR CARRYING OUT THE INVENTION

Figure 2:
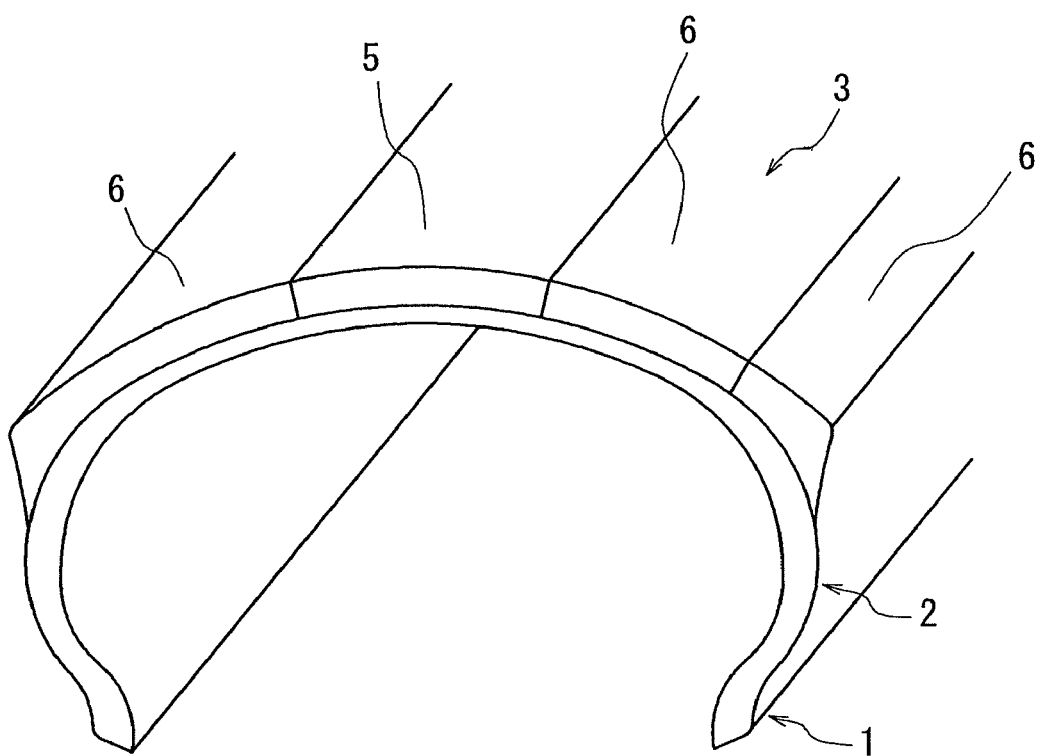
FIG. 2 is a perspective view of a part of a section in the tire widthwise direction of the tire as shown in FIG. 1.
Figure 3:
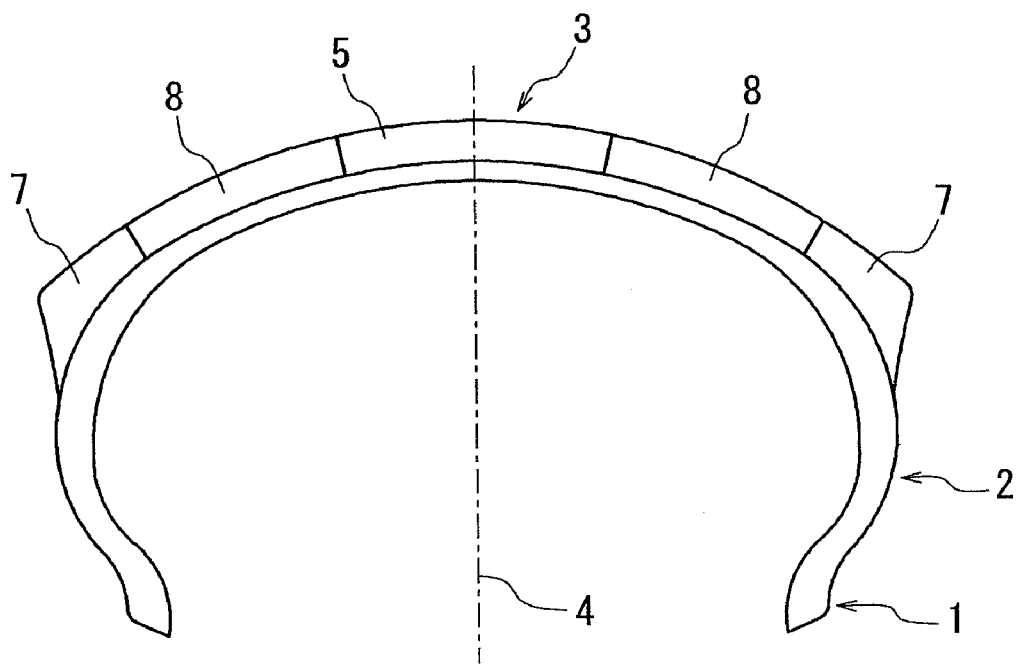
FIG. 3 is a sectional view in the tire widthwise direction of another representative tire according to the present invention.
Figure 4:
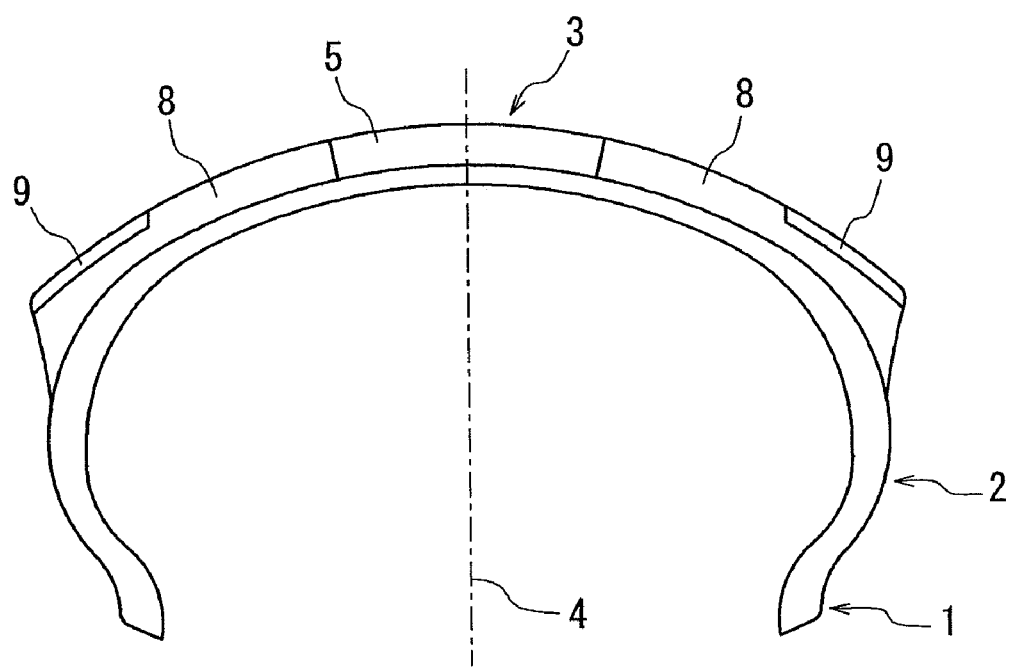
FIG. 4 is a sectional view in the tire widthwise direction of yet another representative tire according to the present invention.
Figure 5:
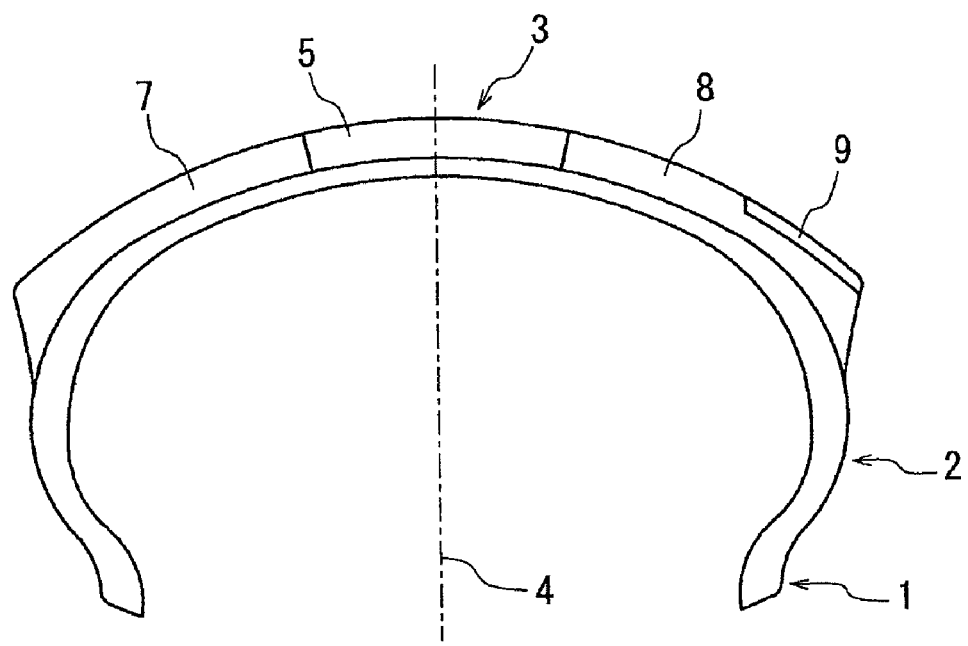
FIG. 5 is a sectional view in the tire widthwise direction of yet another representative tire according to the present invention.

An embodiment of the present invention will be described hereinafter with reference to the drawings. FIG. 1 is a sectional view in the tire widthwise direction of a representative pneumatic tire for a motorcycle according to the present invention (which tire will be referred to as "tire" hereinafter). FIG. 2 is a perspective view of a section in the tire widthwise direction of the tire as shown in FIG. 1. FIGS. 3 to 5 are sectional views in the tire widthwise direction of other tires according to the present invention.

Each of the tires as shown in FIG. 1 and FIG. 2 includes a pair of bead portions 1 having bead cores embedded therein, a pair of sidewalls 2 extending on the outer side in the tire radial direction from the bead portions 1, and a tread portion 3 extending over the respective sidewall portions 2. The tread portion 3 is constituted of at least four tread regions 5, 6 such that, when the tread regions are viewed in a section in the tire widthwise direction, loss tangent values of rubbers constituting the adjacent tread regions are different from each other. The center tread region 5 as a tread region including the tire equatorial plane 4, of the tread regions 5 and 6, is constituted of rubber having loss tangent smaller than that of rubber constituting each of other tread regions 6. Accordingly, when such other tread region(s) as described above is brought into contact with a road surface in cornering situation, the rubber constituting each of other tread regions 6 generates sufficient heat and the temperature at these other tread regions rises up to a temperature in the temperature range required for demonstrating good gripping performance because these other tread regions 6 have relatively large loss tangent, whereby good gripping performance can be sufficiently ensured. Further, when the center tread region 5 is brought into contact with a road surface in running straight, heat generation at the center tread region 5 is sufficiently suppressed because loss tangent at the center tread region 5 is relatively small, whereby occurrence of break at the center tread region 5 due to excess heat generation can be prevented. In the present invention, "loss tangent" prescribed as above is defined under the condition of 100° C. because a tread portion 3 of a tire for use in running at a relatively high speed as used in racing experiences a high rubber temperature in a range of, e.g. 80 to 100° C., in running at a relatively high speed.

Further, regarding the loss tangent (values) of the rubbers constituting the tread regions, it is preferable that a rubber of a tread region disposed in the outer side in the tire widthwise direction has the larger loss tangent because, in a cornering situation using a relatively large camber angle, the more banking of a motorcycle, the more the tread region disposed on the outer side in the tire widthwise direction is brought into contact with a road surface and, in such a situation, if the loss tangent in the ground contact area is not sufficiently large, the ground contact area of the tread does not generate sufficient heat and the temperature in the area fails to rise up to the temperature range required for demonstrating good gripping performance. In such a case where the loss tangent in the ground contact area is not sufficiently large, it is not possible to sufficiently ensure gripping performance and effect balance by resisting centrifugal force of a vehicle by friction force with a road surface, possibly resulting in slip of the tire. It is possible, of course, to modify the structure of the present invention so as to increase, in accordance with the main camber angle which is likely to be used in cornering situation, the loss tangent of the tread region(s) which are expected to come into contact with the ground.

Yet further, the loss tangent of each of the rubbers constituting other tread regions 6 is preferably in the range of 105 to 150% of the loss tangent of the rubber constituting the center tread region. In a case where the loss tangent of each of the rubbers constituting said other tread regions 6 is smaller than 105% of the loss tangent of the rubber constituting the center tread region 5, the loss tangent of each of said other tread regions 6 is so small that other tread regions 6 fail to generate sufficient heat in cornering situation and the temperature in these regions do not rise up to the temperature range required for demonstrating good gripping performance, whereby sufficient gripping performance may not be obtained, although such small loss tangent may rather suppress heat generation in other tread regions 6 in cornering situation and thus prevent a trouble due to excess heat generation from occurring. In a case where the loss tangent of each of the rubbers constituting said other tread regions 6 exceeds 150% of the loss tangent of the rubber constituting the center tread region 5, the loss tangent of each of other tread regions 6 is so large that other tread regions 6 generates heat excessively in cornering situation, which may result in break of other tread regions 6 due to such excess heat generation.

Yet further, as shown in FIG. 3, it is preferable that the tread portion 3 is constituted of the center tread region 5, two shoulder tread regions 7 each including a ground contact end of the tread, and two intermediate tread regions 8 interposed by the center tread region 5 and the respective shoulder tread regions 7. In a case where the rubber constituting the center tread region 5 has the smallest loss tangent among the rubbers constituting the tread regions and sufficiently retains good traction performance and a good heat-releasing effect when the tire runs straight, it is then necessary to dispose rubbers constituting the tread regions such that the more a motorcycle effects banking in cornering situation, the larger the loss tangent at the ground contact area of said other tread regions becomes, i.e. a rubber of a tread region on the outer side in the tire widthwise direction has the larger loss tangent, in order to increase the temperature at the tread region up to the temperature range required for attaining good gripping performance, to ensure good gripping performance. By setting loss tangent of each intermediate tread region 8 larger than that of the center tread region 5 and further setting loss tangent of each shoulder tread region 7 larger than that of each intermediate tread region 8, gripping performance of sufficiently high level proportional to the camber angle of banking can be ensured.

Yet further, the width of the center tread region 5 is preferably in the range of 0.15 to 0.35 times and more preferably 0.20 to 0.30 times as wide as the tread width. The sum of the widths of the two intermediate tread regions 8 is preferably in the range of 0.25 to 0.80 times and more preferably 0.35 to 0.70 times as wide as the tread width. Further, the sum of the widths of the two shoulder tread regions 7 is preferably in the range of 0.05 to 0.40 times and more preferably 0.08 to 0.30 times as wide as the tread width. In a case where any of the aforementioned preferable ranges regarding the widths of the tread regions are not satisfied, the balance between durability at a relatively high speed in running straight and gripping performance in cornering situation is lost and running performances may deteriorate.

Yet further, the loss tangent of the rubber constituting each shoulder tread region 7 is preferably in the range of 105 to 135% and more preferably 105 to 125% of the loss tangent of the rubber constituting each intermediate tread region 8. In a case where the loss tangent of the rubber constituting each shoulder tread region 7 exceeds 135% of the loss tangent of the rubber constituting each intermediate tread region 5 (8), when the shoulder tread region 7 is brought into contact with a road surface in cornering situation, the loss tangent of the shoulder tread region 7 is so large that the temperature at the shoulder tread region 7 rises up excessively, whereby break of the shoulder tread region 7 due to this excess heat generation may occur. In a case where the loss tangent of the rubber constituting each shoulder tread region 7 is smaller than 105% of the loss tangent of the rubber constituting each intermediate tread region 8, when the shoulder tread region 7 is brought into contact with a road surface in cornering situation, the loss tangent of the shoulder tread region 7 is so small that the shoulder tread region 7 fails to generate heat sufficiently and the temperature at the shoulder tread region 7 does not rise up to the temperature range required fro demonstrating good gripping performance, whereby satisfactory gripping performance may not be obtained.

The foregoing descriptions explain only a part of an embodiment of the present invention, and the structures described above can be combined with each other and/or various modifications can be added thereto within the spirit of the present invention. For example, as shown in FIG. 4, the tread portion 1 may be constituted of the intermediate tread regions 8, on the left and right sides of the tire, formed of rubber having relatively large loss tangent and the center tread region 5 interposed by the respective intermediate tread regions 8 and formed of rubber having loss tangent smaller than that of rubber constituting the intermediate tread regions 8, wherein the shoulder tread region 7 may be provided or laminated as a surface rubber layer 9 on the outer side in the tire widthwise direction and the tire radial direction of the intermediate tread region 8. The surface rubber layer 9 is formed of rubber of which loss tangent is larger than that of the rubber constituting the intermediate tread region 8. In a tire having such a structure as described above, as in the FIG. 3 tire in which the tread portion is divided into five tread regions, good gripping performance in cornering situation and durability at a relatively high speed in running straight are sufficiently ensured. Further, due to the structure in which the surface rubber layer 9 is laminated on each intermediate tread region 8, excess heat generation can be suppressed in the tread portion 3 as a whole, whereby durability of the tire is enhanced. Yet further, as shown in FIG. 5, the surface rubber layer 9 may be provided only in one of the half-tread regions of the tread portion 3 (the half region on the right hand side in the example shown in FIG. 5).

EXAMPLES

Next, test tires according to the present invention were produced and the running performances thereof were tested as described below.

In each of Example 1 tire and Example 2 tire, a tread portion thereof is constituted of five tread regions as shown in FIG. 3 and each tire is a pneumatic slick tire for a motorcycle, having tire size of 190/650R16.5, characteristics as shown in Table 1 and no grooves in the tread portion thereof. The numerical values of loss tangent shown in Table 1 are relative values in which the loss tangent of the center tread region of the Example tires is converted to 100 as the reference value and the loss tangent at other tread regions are expressed relative to the reference value.

The measured loss tangent of the center tread region of each of the Example tires is 0.3.

TABLE 1

| | Loss tangent | | | Tread portion occupying rate (%) | | |
|---|---|---|---|---|---|---|
| | Center tread region | Intermediate tread region | Shoulder tread region | Center tread region | Intermediate tread region | Shoulder tread region |
| Example 1 | 100 | 120 | 138 | 25 | 55 | 20 |
| Example 2 | 100 | 130 | 125 | 22 | 68 | 10 |

TABLE 1-continued

|  | Loss tangent | | | Tread portion occupying rate (%) | | |
| --- | --- | --- | --- | --- | --- | --- |
|  | Center tread region | Intermediate tread region | Shoulder tread region | Center tread region | Intermediate tread region | Shoulder tread region |
| Conventional Example 1 | 113 | — | 125 | 50 | — | 50 |
| Conventional Example 2 |  | 120 |  |  | — |  |

Figure 6:
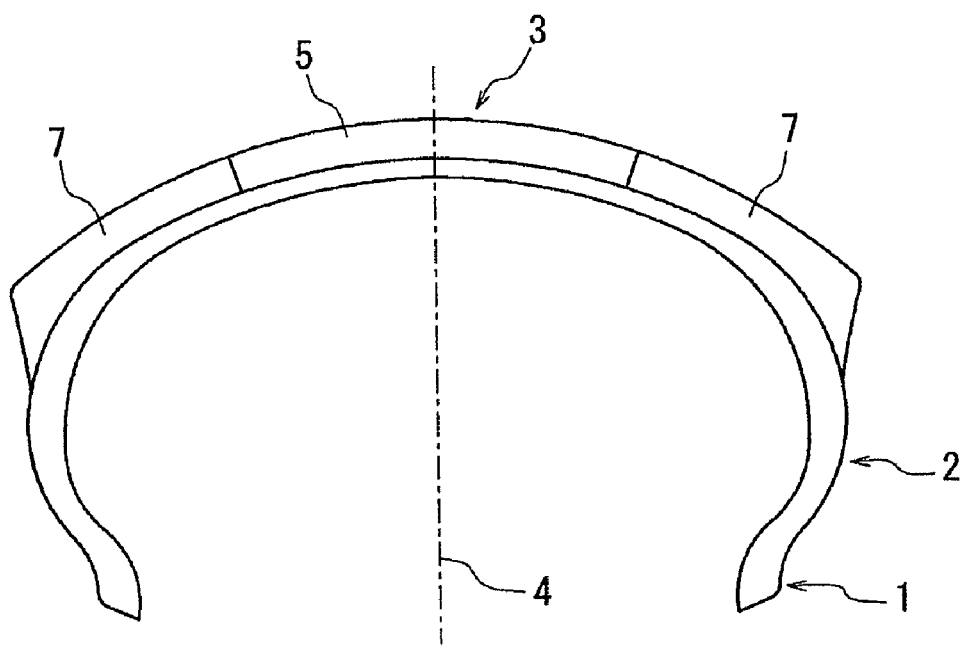
FIG. 6 is a sectional view in the tire widthwise direction of a conventional tire.
Figure 7:
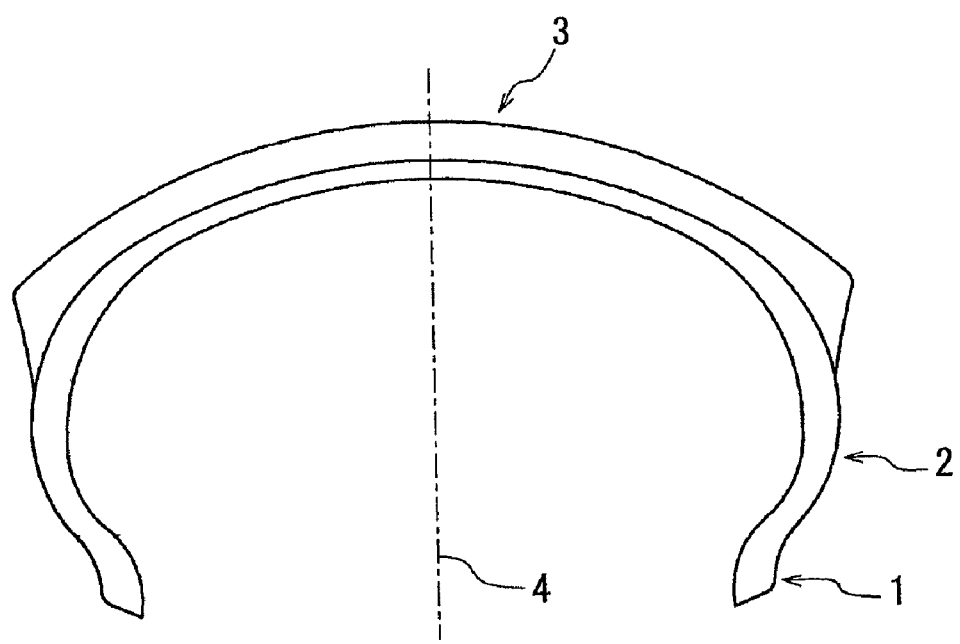
FIG. 7 is a sectional view in the tire widthwise direction of a conventional tire.

Further, for comparison, Conventional test tires 1 and 2 were produced as follows. Conventional tire 1 has the structure as shown in FIG. 6 and the characteristics as shown in Table 1. Further, Conventional tire 2 has the structure as shown in FIG. 7 and the characteristics as shown in Table 1.

Each of the test tires was assembled with a rim having size of MT6.25×16.5, to be a tire wheel. Each of the tire wheels thus obtained was mounted to a 1000 cc racing motorcycle for use in the tests and the traction performance in running on a dry road surface and gripping performance were evaluated with applying an internal air pressure 220 kPa (a relative pressure) and a load of 2.0 kN to the tire. The gripping performance in cornering situation was evaluated by feelings felt by a test rider and by comparing data of the vehicle speed and the slip rate measured by an analyzer mounted to the test vehicle, between a case where the camber angle was 45° or larger (i.e. the camber angel was relatively large) and a case where the camber angle was smaller than 45° (i.e. the camber angel was relatively small). Durability at a relatively high speed in running straight was evaluated by the temperature of a tire which had generated heat after the tire ran straight at a relatively high speed in a racing course and the degree of break at the tread portion after an indoor durability drum test was carried out.

The numerical values in evaluation in each test were determined with ten scores as the full score. The evaluation results are shown in Table 2.

TABLE 2

|  | Example 1 tire | Example 2 tire | Conventional Example 1 tire | Conventional Example 2 tire |
| --- | --- | --- | --- | --- |
| Durability at relatively high speed | 7 | 7 | 6 | 5 |
| Cornering performance: large camber angle | 8 | 7 | 7 | 6 |
| Cornering performance: small camber angle | 7 | 8 | 7 | 8 |

As is obvious from the result of Table 2, Example 1 tire and Example 2 tire exhibit equivalent or improved cornering performance and significantly improved durability at a relatively high speed, as compared with Conventional Example 1 tire and Conventional Example tire 2. Although cornering performance at a relatively small camber angle of Example 1 tire is slightly poorer than that of Comparative Example 2, durability at a relatively high speed and cornering performance at a relatively large camber angel of Example 1 tire have been significantly improved, whereby it is reasonably concluded that the tire performances in total of Example 1 tire have been improved. Therefore, as a whole, Example tire 1 and Example tire 2 have successfully made durability performance at a relatively high speed compatible at a satisfactory level with cornering performance.

INDUSTRIAL APPLICABILITY

As is apparent from the foregoing descriptions, according to the present invention, it is possible to provide a pneumatic tire for a motorcycle, in which tire durability at a relatively high speed in running straight is enhanced with maintaining good gripping performances in cornering situation by optimizing the distribution of loss tangent in tread rubbers constituting a tread portion.

The invention claimed is:

1. A pneumatic tire for a motorcycle, including a pair of bead portions having bead cores embedded therein, a pair of sidewalls extending on the outer side in the tire radial direction from the bead portions, and a tread portion extending over the respective sidewall portions,
    wherein the tread portion is constituted of at least four tread regions such that, when the tread regions are viewed in a section in the tire widthwise direction, loss tangent values of rubbers constituting the adjacent tread regions are different from each other,
    a loss tangent value at 100° C. of a rubber constituting a center tread region as a tread region including the tire equatorial plane, of the tread regions, is smaller than a loss tangent value at 100° C. of each of rubbers constituting other tread regions,
    the other tread regions include two tread regions interposing the center tread region in the tire widthwise direction and a surface rubber layer provided on the outer side in the tire widthwise direction and the tire radial direction of at least one of the two tread regions by replacing a portion thereof, and
    the surface layer is formed of rubber having a loss tangent value of 100° C. that is larger than the loss tangent value at 100° C. of the rubber constituting the two tread regions.

2. The pneumatic tire for a motorcycle of claim 1, wherein the loss tangent of each of the rubbers constituting said other tread regions is in the range of 105 to 150% of the loss tangent of the rubber constituting the center tread region.

3. The pneumatic tire for a motorcycle of claim 2, wherein the surface layer is provided on each of the two tread regions.

4. The pneumatic tire for a motorcycle of claim 2, wherein the surface layer is provided on only one of the two tread regions.

5. The pneumatic tire for a motorcycle of claim 1, wherein the surface layer is provided on each of the two tread regions.

6. The pneumatic tire for a motorcycle of claim 1, wherein the surface layer is provided on only one of the two tread regions.

* * * * *